B. P. GILMAN.
OIL BURNING EQUIPMENT FOR LOCOMOTIVES.
APPLICATION FILED APR. 14, 1914.

1,145,985.

Patented July 13, 1915.
7 SHEETS—SHEET 1.

Inventor
B. P. Gilman
By Victor J. Evans
Attorney Witnesses B. P. GILMAN.
OIL BURNING EQUIPMENT FOR LOCOMOTIVES.
APPLICATION FILED APR. 14, 1914.

1,145,985.

Patented July 13, 1915.
7 SHEETS—SHEET 2.

B. P. GILMAN.
OIL BURNING EQUIPMENT FOR LOCOMOTIVES.
APPLICATION FILED APR. 14, 1914.

1,145,985.

Patented July 13, 1915.
7 SHEETS—SHEET 3.

B. P. GILMAN.
OIL BURNING EQUIPMENT FOR LOCOMOTIVES.
APPLICATION FILED APR. 14, 1914.

1,145,985.

Patented July 13, 1915.
7 SHEETS—SHEET 4.

Witnesses
E. P. Ruppert
J. W. Garner

Inventor
B. P. Gilman

By Victor J. Evans
Attorney

B. P. GILMAN.
OIL BURNING EQUIPMENT FOR LOCOMOTIVES.
APPLICATION FILED APR. 14, 1914.

1,145,985.

Patented July 13, 1915.
7 SHEETS—SHEET 7.

Witnesses
E. R. Ruppert
J. W. Gardner

Inventor
B. P. Gilman
By Victor J. Evans
Attorney

UNITED STATES PATENT OFFICE.

BENOIST P. GILMAN, OF YOAKUM, TEXAS.

OIL-BURNING EQUIPMENT FOR LOCOMOTIVES.

1,145,985.          Specification of Letters Patent.     Patented July 13, 1915.

Application filed April 14, 1914. Serial No. 831,824.

*To all whom it may concern:*

Be it known that I, BENOIST P. GILMAN, a citizen of the United States, residing at Yoakum, in the county of Lavaca and State of Texas, have invented new and useful Improvement in Oil-Burning Equipments for Locomotives, of which the following is a specification.

This invention is an improved oil burning equipment for locomotives and relates especially to improvements in the construction of the fire box whereby the same is protected against sudden changes of temperature and is also kept supplied with heated air which promotes the combustion of the vapor of the oil fuel and enables a complete and economical use of oil fuel to be made.

The invention consists in the construction, combination and arrangement of devices hereinafter described and claimed.

In the accompanying drawings.

Figure 1:
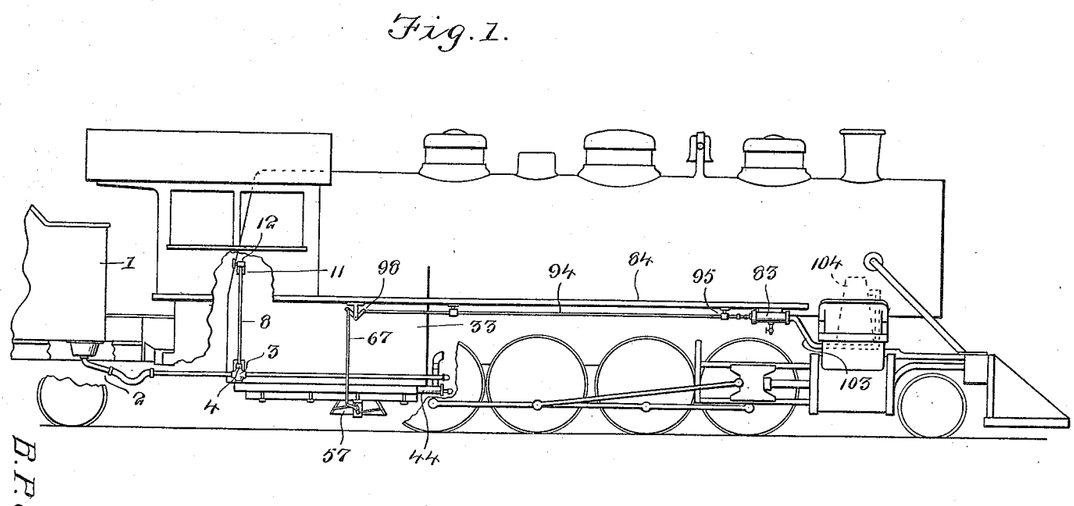
—Figure 1 is an elevation, partly broken away, of portions of a locomotive and tank car or tender provided with oil burning equipment constructed in accordance with my invention.
Figures 2, 3:
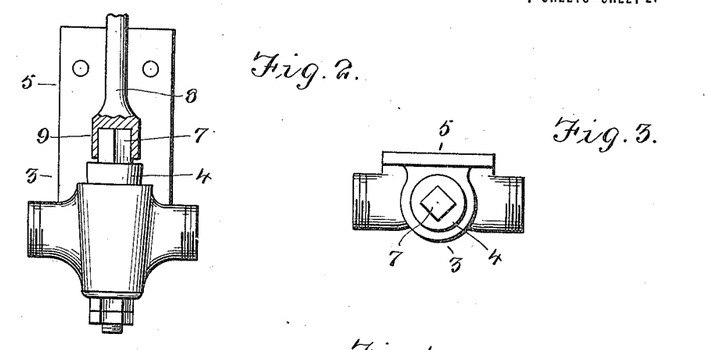
Fig. 2 is a detail side elevation of the fuel supply valve.
Fig. 3 is a detail plan of the same.

The oil tank is indicated at 1 and the oil feed pipe which leads from the tank to the burners is indicated at 2. This feed pipe is connected to a valve casing 3 which is provided with a plug 4 that may be turned to open or cutoff flow of oil through the feed pipe 2 and to regulate the passage of oil therethrough. This valve casing 3 is provided with a supporting bracket 5 which is bolted to the lower portion of the leg 6 of the locomotive boiler. Said plug also has an angular head 7 at its upper end.

Figure 4:
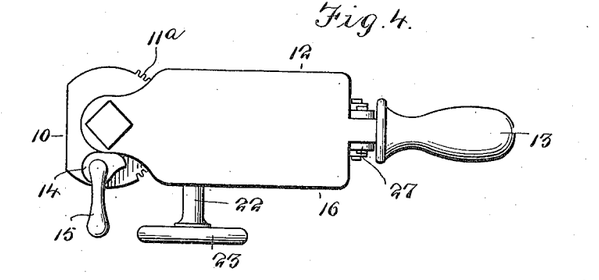
Fig. 4 is a detail plan of the valve operating mechanism.
Figure 5:
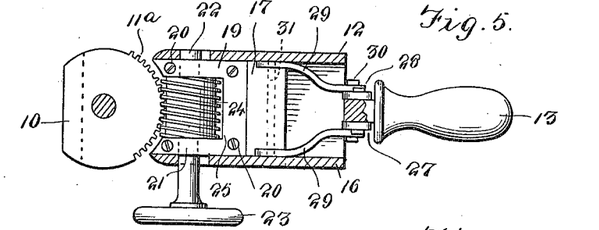
Fig. 5 is a plan view similar to Fig. 4 but with the part 12 broken away.
Figure 6:
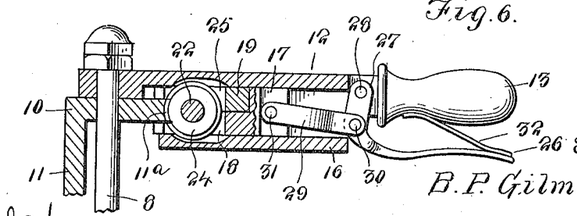
Fig. 6 is a vertical longitudinal sectional view of the valve operating mechanism.
Figures 7, 12:
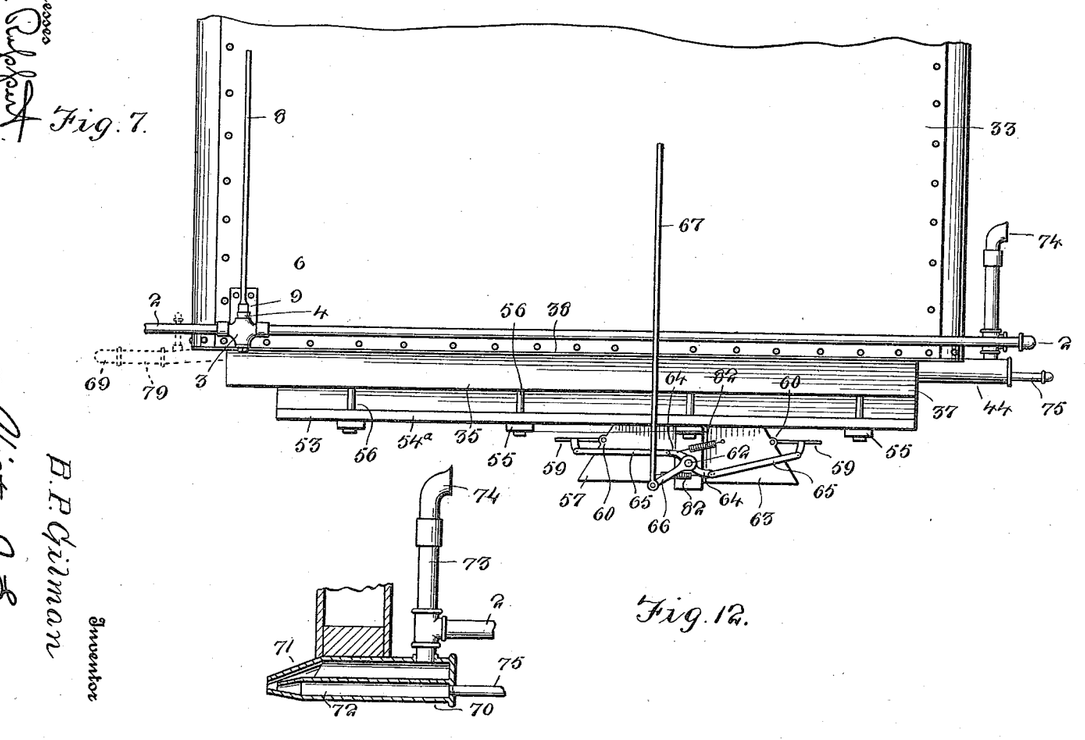
Fig. 7 is a detail elevation of the fire box.
Fig. 12 is a detail vertical longitudinal sectional view of the main burner.
Figure 8:
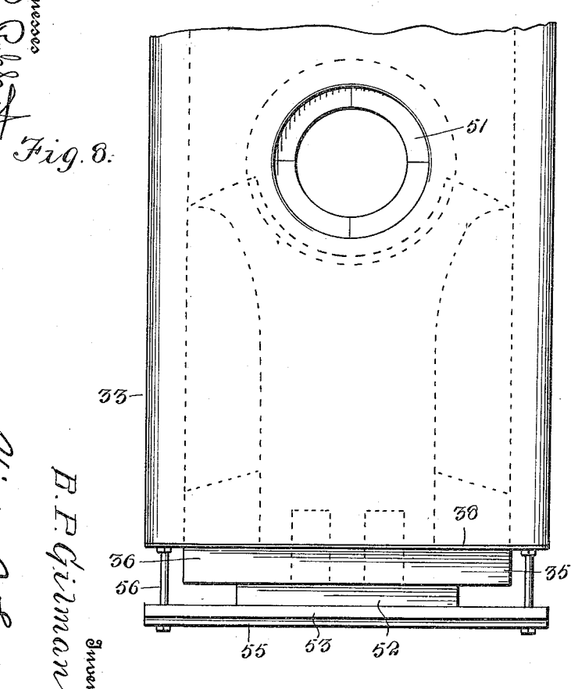
Fig. 8 is a detail rear elevation of the same.

A vertically arranged stem 8 has its lower end provided with a socket 9 which is fitted on the head 7 of the plug. This stem extends up through the deck of the locomotive cab and its upper end passes through and has a bearing in the horizontal segment arm 10 of a bracket 11 which is bolted to the boiler head at a suitable point. This segmental arm 10 is provided with spur teeth 11$^a$. A valve lever 12 is attached to the upper end of the stem 8 and arranged to turn on the segment arm 10, said stem forming the pivot of said valve lever and the latter being provided at its outer end with a handle 13. A cam 14 is provided for locking the lever to the segment arm 10 at any desired point, according to the desired adjustment of the plug 4, and the said cam has a clamp handle 15 by means of which it may be readily operated. On the under side of the valve lever is a guide casing 16 in which operates a block 17 that comprises a lower member 18 and an upper member 19 which are secured together by screws 20. These members are provided in their opposing sides with bearings 21 for an adjusting shaft 22. Said adjusting shaft has a hand wheel 23 at its outer end by means of which it may be readily turned to any desired extent and the said adjusting shaft also has an adjusting worm 24 which engages the gear or graduating teeth 11 of the segment arm 10. This worm revolves with the shaft 22 and is arranged in an opening 25 with which the members of the block 17 are provided. An operating lever 26 is provided for the block 17 to shift the latter longitudinally to engage or disengage the worm 24 with respect to the toothed segment 10. This operating lever is arranged on the under side of the handle 13 and has a forked angle arm 27 which is arranged astride of and pivotally connected to the outer portion of the securing valve lever, its pivot being indicated at 28. Links 29 connect the lever 26 with the worm shifting block 17, said links being pivoted to said lever as at 30 at a point a suitable distance from the lever pivot 28 and being pivotally connected to the member 18 of said block as at 31. A spring 32 is attached to the lever 26, bears against the under side of the handle 13 and normally depresses said lever 26 so as to cause it to hold the block 17 in the required position to keep the worm 24 engaged with the graduating teeth of the segment arm.

When the worm gear is disengaged from the graduating teeth of the segment arm the valve lever may be directly turned, to turn the stem 8, and hence also the plug to approximately adjust the plug or to fix the latter in open or closed position. Grasping the handle 13 causes the lever 26 to disengage the worm, as will be understood, and the mere act of releasing the grasp on the handle 13 and lever 26 will permit the spring 32 to reëngage the worm with the teeth of the segment arm. Having thus approximately set the plug the engineer or fireman may then, by turning the worm 24 by means of the hand wheel 23, cause said worm to coact with the toothed segment arm to finely adjust the plug so that the feed of oil through the oil feed pipe to the burner or burners may be exactly regulated and the burner or burners kept supplied with just a sufficient quantity of oil to maintain combustion in the fire box to the desired extent. This enables me to effect a great economy in the oil fuel by preventing the wasting thereof by being supplied in excessive quantity to the burner or burners. The clamping cam when set, prevents casual moving of any of the parts of the valve out of adjustment.

Figure 9:
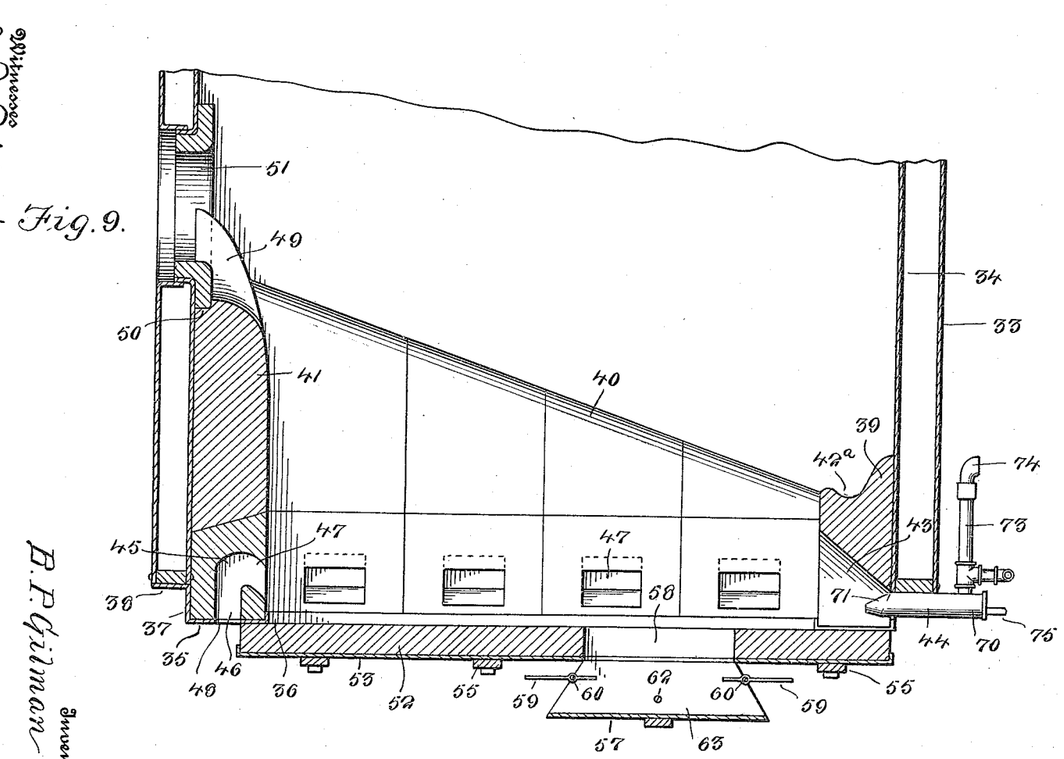
Fig. 9 is a detail vertical longitudinal sectional view of the same.
Figure 10:
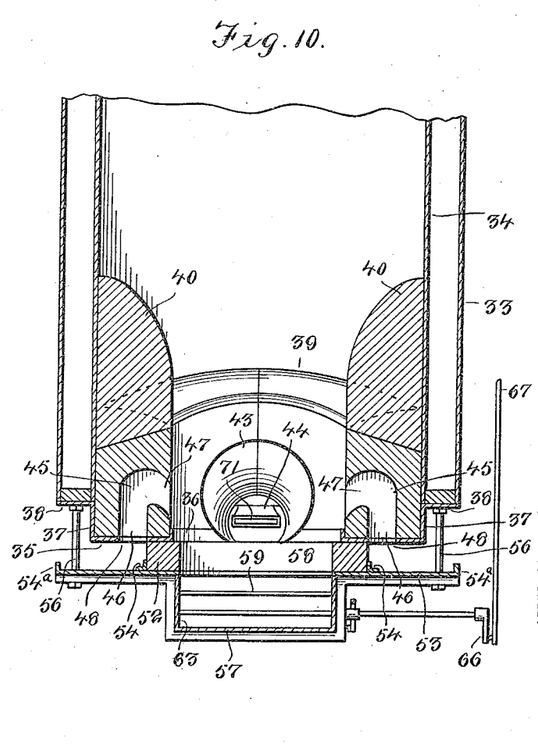
Fig. 10 is a detail vertical transverse sectional view of the same looking toward the front end of the fire box.
Figures 11, 13, 17:
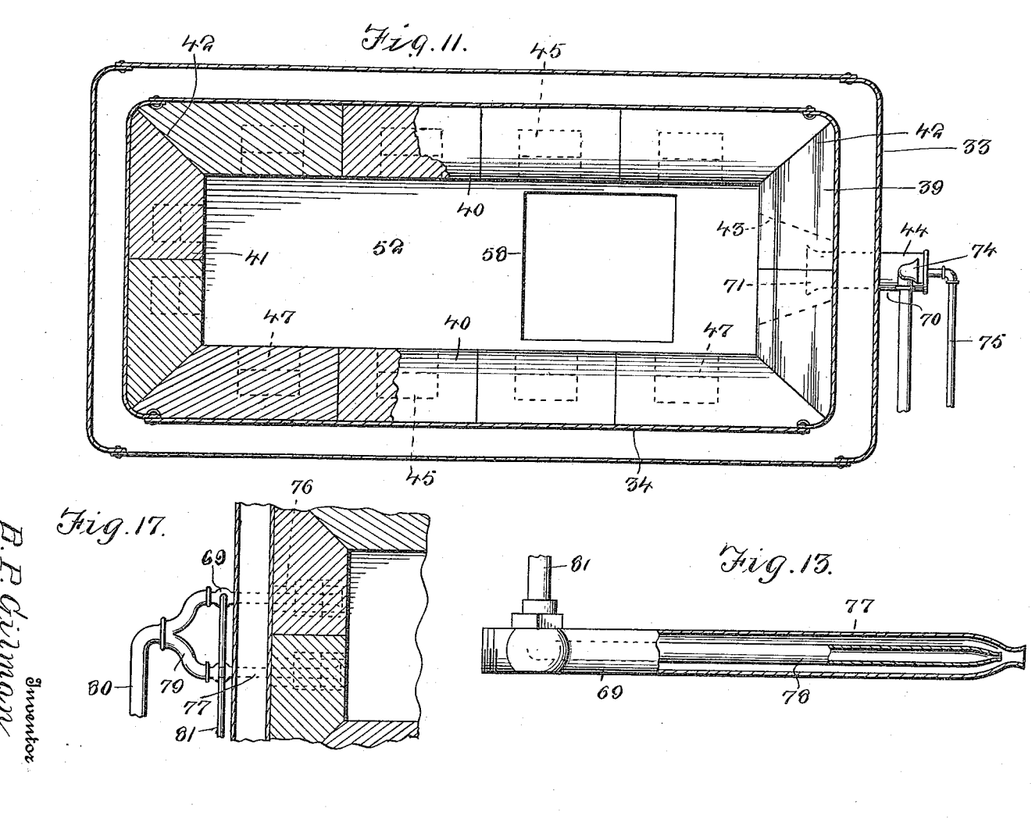
Fig. 11 is a horizontal sectional view of the same.
Fig. 13 is a similar view of the secondary burners.
Fig. 17 is a detail horizontal sectional view of the fire box and a plan of a pair of secondary burners which may be used in accordance with a modification.

The fire box 33 has its casing or inner shell 34 lined with fire brick. These fire bricks are supported on an iron or steel sheet 35 which is arranged around and extends below the fire box and is formed with an opening corresponding in length and breadth with the dimensions of the space in the fire box between the fire brick. The lower portions of the fire brick extend somewhat below the mud ring and the said sheet 35 has an upturned flange wall 36 that bears against the inner sides of the fire bricks, an upturned flange wall 37 that bears against the outer sides of the fire brick and an outturned elevated portion or web 38 which is secured to the under side of the mud ring. These fire bricks comprise front end members 39, side wall members 40 and rear end members 41. Miter joints 42 are formed between the fire brick at the corners of the fire box as shown in Fig. 11. The front end bricks 39 are lower than the others, the side wall bricks 40 are progressively higher as they extend toward the rear end of the fire box and the rear end or wall bricks 41 are the highest of all of the fire bricks. The front end fire bricks 39 present a concave arcuate surface 42$^a$, the concavity of said surface being longitudinal of said fire bricks and transverse with respect to the fire box but said fire bricks are higher at their centers than at their outer sides so that the arcuate surface 42$^a$ is highest at the center of the front wall of the fire box. A rearwardly enlarging opening 43 is formed in the opposing sides of the said fire bricks 39 and at the center of the front end of the fire box, the front end and smaller end of said opening being mainly below the level of the mud drum and so that the burner 44 hereinafter described, and which is secured to the mud drum, may be arranged with its discharge end in the said opening 43.

The lower side bricks 40 are hollowed out to provide air inlet openings 45 each of which comprises a vertical intake arm 46, open at the lower end and a downwardly and inwardly inclined discharge arm 47 open at the inner end, the said discharge arm communicating with and being at an angle to said intake arm and the said opening being curved in the angle between the said arms as shown. The sheet 35 has openings 48 which register with the intake ends of said air supply openings 45 in the bricks 40. The rear end wall fire bricks 41, of which there are two, are formed in their upper ends with a semi-circular recess 49 having a groove 50 in which is fitted the lower side of a fire brick ring 51 that extends around and protects the door flange. A fire brick floor 52 is provided for the fire box. The bricks of this fire brick floor are supported on an iron or steel sheet 53 which has upturned side flanges 54$^a$. The length and breadth of the fire brick floor somewhat exceeds the corresponding dimensions of the space formed by the fire brick lining of the fire box and the said fire bricks 39—40 and 41 bear, at the inner sides of their bottoms on the metal sheet 35. The said fire brick lining of the fire box projects beyond and overhangs the ends and sides of the fire brick floor and the openings 45 in the hollow fire brick 40 are uncovered by the fire brick floor and the entrance of air into the fire box through said openings is unobstructed. These fire bricks 52 which constitute the floor of the fire box are held in place on the sheet 53 by angle iron strips or flanges 54. Supporting bars 55 are provided for the brick floor and said sheet 53 and extend transversely under the latter and are arranged at suitable distances apart. These supporting bars are suspended from the fire box by bolts 56, the upper ends of which are attached to the mud ring.

The air, by the foregoing construction and arrangement of the parts of the fire box, is fed to the fire box, to promote combustion, through the openings 45 in some of the hollow bricks with which the fire box is lined. The brick lining and floor of the fire box become highly heated and hence the air is also highly heated as it enters through the openings 45 and being supplied to the fire box in such heated condition serves to greatly promote combustion in the fire box and enables steam at the desired pressure to be readily maintained in the boiler. The fire brick lining and floor of the fire box also conserve the heat therein and prevent sudden changes of temperature from occurring in the fire box. Such changes are very injurious to both fire box and boiler and by my construction, whereby I avoid such changes, a very material improvement is effected and one which will be appreciated by engine drivers and in the repair shop.

The top of the air inlet box 57 coincides with an opening 58 in the fire brick bottom 52 of the fire box and which opening is at a suitable distance from the front end of the fire box. At the front and rear sides of the air inlet box are dampers 59 which are pivotally mounted as at 60 for vertical angular movement, to open and closed position, and each of these dampers is provided at one end with a curved arm 61. A rock shaft 62 extends transversely across the center of the air inlet box and has its bearings in the side walls 63 of the air inlet box. At one end of this rock shaft are oppositely extending curved rock arms 64 which are connected to the arms 61 of the dampers by links 65. At the same end of the said rock shaft is a crank arm 66. A vertically movable connecting rod 67 of the damper controlling mechanism, hereinafter described, has its lower end pivotally connected to the said arm 66. The fire box is here shown in Figs. 9 and 11 as equipped with a main burner 44 at the front end and is shown in Fig. 17 as equipped with a pair of secondary burners 69 at the rear end. The main burner comprises a tubular nozzle 70 having a broadened and flattened discharge end 71 and an atomizer nozzle 72 which is arranged in the said nozzle 70. The oil feed pipe 2 is connected to a vertical vent pipe 73 the lower end of which discharges into the rear end of the nozzle 70 and the vent pipe is provided at its upper end with a curved funnel 74. A live steam pipe 75 is connected to the atomizer nozzle 72 and serves to atomize the oil and to discharge the oil in an atomized condition from the nozzle 70 into the fire box, where the mixture of atomized oil and steam burns.

Ordinarily the main burner is the only one required. In cases however, where the fire box is long it is desirable to also install and use the secondary burners. These secondary burners enter the fire box through openings 76 in hollow bricks at the back of the fire box. Each secondary burner comprises an oil nozzle 77 and an atomizing nozzle 78 arranged therein. The outer ends of the oil nozzles are connected by a union 79 to a branch pipe 80 which leads from the oil feed pipe 2 and the atomizing nozzles 78 are connected to a steam pipe 81.

I have herein shown and described my fire box and the burners associated therewith as for use on a locomotive but it will be evident that the same may also be used in connection with stationary steam boilers and for other like purposes and I would have it understood that I do not limit myself in this particular.

The dampers of the air inlet box are equipped with coiled springs 82 of low resistance which normally close said dampers and hold them closed and yet so that they may be readily opened. To automatically open the dampers when the locomotive is running I provide an exhaust steam pressure actuated mechanism which I will now describe.

Figure 14:
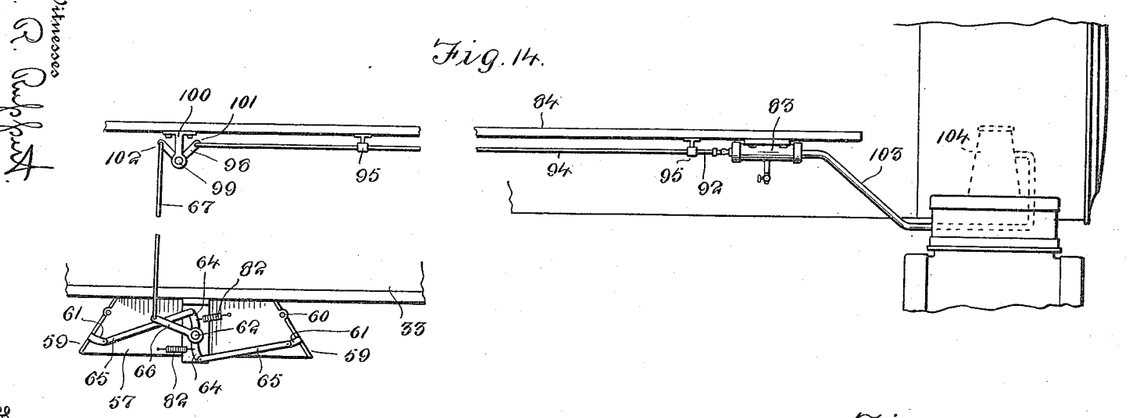
Fig. 14 is a detail view of the exhaust steam actuated means for automatically controlling the dampers of the air inlet box.
Figure 15:
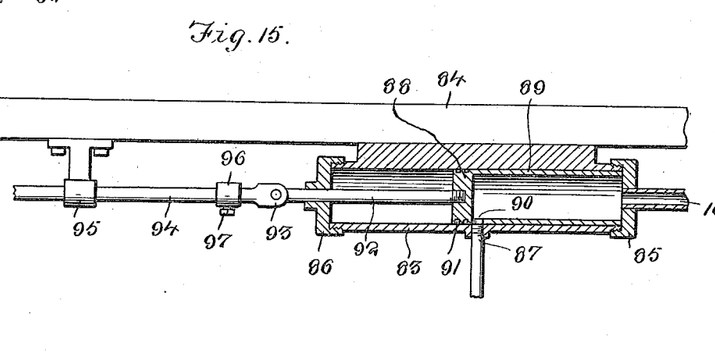
Fig. 15 is a detail sectional view on a larger scale of the cylinder and piston and connections of said damper controlling mechanism.

A cylinder 83 is secured at a suitable point to the locomotive and is here shown as bolted to the underside of the running board 84. This cylinder has heads 85—86 screwed respectively to the front and rear ends thereof and in one side of the cylinder at its center, is a vent opening 87. A piston 88 is arranged for reciprocating movement in the cylinder and has a forwardly extending sleeve 89 which is provided in one side with a vent opening 90 which registers with the vent opening 87 when the piston is at the front limit of its stroke. The piston is provided with suitable packing rings 91 and also with a piston rod 92. The piston rod operates in an opening in the rear cylinder head 86 and is connected by a knuckle joint 93 to a rod 94 which is adapted to reciprocate in guide openings in a pair of hangers 95 which are secured to and depend from the running board. A stop collar 96 to limit the stroke of the piston, is secured on the rod 94 by a set screw 97 and is suitably spaced from the front hanger 95. A bell crank 98 is pivotally connected as at 99 to a hanger 100 which is also bolted to and depends from the running board. The rear end of the rod 94 is pivotally connected as at 101 to one arm of the bell crank and the upper end of the rod 67 which operates the air inlet box dampers is pivotally connected to the other arm of the bell crank as at 102. A steam feed pipe 103 is connected to the front head of the cylinder 83 and is also connected to the exhaust nozzle stand 104 of the locomotive engine.

Normally the piston 88 is at the front limit of its stroke with the vent opening 90 of its sleeve registering with the vent opening 87 of the cylinder and when the engine is running slowly steam from the stand 104 is freed from the front side of the piston through said vent holes, and by backing up into the exhaust. The piston remains in this position until the engine acquires such speed that the consequent increased rapidity of the exhaust causes pressure from the exhaust stand 104 to be applied to the front side of the piston in the cylinder 83 through the pipe 103 and such pressure moves the piston rearwardly thereby causing it to correspondingly actuate the rod 94, partly turn the bell crank 98 and cause said bell crank through the instrumentality of the rod 67, arm 66, rock shaft 62, arm 64 and links 65 to open the dampers of the air inlet box against the resistance of their springs and to hold said dampers open while the engine is running, thus furnishing an increased quantity of air for combustion in the fire box. The openings in the hollow fire bricks forming part of the lining of the fire box furnish sufficient air for combustion until the air inlet box dampers are open. In practice the dampers will be automatically opened by the action of the exhaust steam from the engine when the locomotive has reached a speed of approximately 10 miles per hour.

Figure 16:
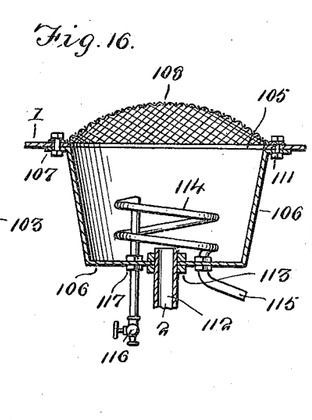
Fig. 16 is a detail view, partly in section and partly in elevation of the oil tank, the intake portion of the oil feed pipe and the heater coil arranged at the intake of said oil feed pipe.

The oil tank 1 has an opening 105 in its bottom, near its front end and a discharge box 106 which is arranged under the bottom and with its wall around said opening. This discharge box has its wall provided with an outwardly extending annular flange 107 which bears against the bottom of the tank. A concavo-convex strainer 108 which is made of four mesh brass wire netting is arranged over the opening 105, with its convex side uppermost and with a peripheral flange and bolts 111 pass through said flange and through openings in the bottom of the tank and in the flange 107 of the box wall and serve to securely fasten the strainer and box in place. Suitable gaskets may also be employed, if required, to prevent leakage. The intake end 112 of the oil feed pipe 2 passes up through an opening in the center of the bottom of the box 106 and is secured by nuts 113. A heating coil 114 is arranged in the box 106 and around the intake end of the oil feed pipe. A steam supply pipe 115 from the locomotive boiler leads to the heating coil and the outlet arm of said coil is provided with a suitable cock 116. The intake and outlet arms of the heater coil pass through opening in the bottom of the box and are secured in place by nuts 117.

By the provision of the discharge box and the heater coil and the arrangement of the latter in said box and at and around the intake end of the oil feed pipe, that portion of the oil in the said box may be kept heated to the requisite extent to cause it to flow freely through the oil feed pipe and to the burners without appreciably raising the temperature of the oil in the main body of the tank, thus avoiding the heating of the body of oil in the tank and the consequent deterioration thereof such as heretofore ordinarily occurred.

Having thus described my invention, I claim:—

1. In oil burning equipment a fire box having walls and also having bricks forming linings for said walls, said fire bricks being provided with air inlet openings which have their intakes at their lower sides and the discharge ends of which are directed inwardly into the fire box at points between the upper and lower sides of said bricks, the fire box being further provided with a fire brick floor.

2. In oil burning equipment a fire box having walls and also having bricks forming linings for said walls, said fire bricks being provided with air inlet openings which have their intakes at their lower sides and the discharge ends of which are directed inwardly and downwardly into the fire box at points between the upper and lower sides of said bricks, the fire box being further provided with a fire brick floor, said fire brick floor being provided with an air inlet box.

3. In oil burning equipment a fire box having a fire brick lining provided with air inlet openings having their intakes at the lower side of the lining and a fire brick floor for the fire box, said fire brick floor bearing against the lower side of the fire brick lining and the latter overhanging the edges of the floor and ends thereby and supporting means for the said fire brick floor and connected to the fire box.

4. In oil burning equipment a fire box having a fire brick lining provided with air inlet openings having their intakes at the lower side of the lining and a fire brick floor for the fire box, said fire brick floor bearing against the lower side of the fire brick lining the latter overhanging the edges of the floor and supporting means for the said fire brick floor and connected to the fire box, said supporting means comprising a sheet on which the fire brick floor rests, supporting bars under the sheet and bolts depending from the walls of the fire box and engaging said bars.

5. In oil burning equipment a fire box having walls and also having bricks forming linings for said walls, said fire bricks being provided with air inlet openings which have their intakes at their lower sides and the discharge ends of which are directed inwardly into the fire box, the fire box being further provided with a fire brick floor, said fire brick floor being provided with an air inlet box, one end wall and lining of the fire box having an opening immediately above the fire brick floor and an oil discharge nozzle in said opening, the opposite end wall of the fire box having a door opening, a fire brick ring forming a lining for said door opening and provided with a flange, and the bricks which form the lining for said walls of the fire box being provided with a recess in which the lower side of said ring is fitted.

In testimony whereof I affix my signature in presence of two witnesses.

BENOIST P. GILMAN.

Witnesses:
 ECK MAY,
 GUIDO KIRCHHOFF.